US006119086A

United States Patent [19]

Ittycheriah et al.

[11] Patent Number: 6,119,086
[45] Date of Patent: Sep. 12, 2000

[54] SPEECH CODING VIA SPEECH RECOGNITION AND SYNTHESIS BASED ON PRE-ENROLLED PHONETIC TOKENS

[75] Inventors: Abraham Ittycheriah; Stephane H. Maes, both of Danbury, Conn.; David Nahamoo, White Plains, N.Y.

[73] Assignee: International Business Machines Corporation, Armonk, N.Y.

[21] Appl. No.: 09/067,863

[22] Filed: Apr. 28, 1998

[51] Int. Cl.[7] .......................... G10L 13/06; G10L 13/08; G10L 15/26

[52] U.S. Cl. .......................... 704/267; 704/235; 704/249; 704/260

[58] Field of Search .................................... 704/235, 249, 704/260, 267

[56] References Cited

U.S. PATENT DOCUMENTS

| | | | |
|---|---|---|---|
| 4,424,415 | 1/1984 | Lin | 704/209 |
| 4,473,904 | 9/1984 | Suehiro et al. . | |
| 4,661,915 | 4/1987 | Ott | 704/254 |
| 4,707,858 | 11/1987 | Fette | 704/200 |
| 5,305,421 | 4/1994 | Li . | |
| 5,524,051 | 6/1996 | Ryan | 380/9 |
| 5,696,879 | 12/1997 | Cline et al. | 704/260 |
| 5,832,425 | 11/1998 | Mead | 704/221 |

OTHER PUBLICATIONS

D. A. Reynolds and L. P. Heck, "Integration of Speaker and Speech Recognition Systems," Proc. IEEE ICASSP 91, p. 869–872, Apr. 1991.

*Primary Examiner*—David R. Hudspeth
*Assistant Examiner*—Tālivaldis Ivars Šmits
*Attorney, Agent, or Firm*—F. Chau & Associates, LLP

[57] ABSTRACT

A speech coding system, responsive to an input speech signal provided by a system user, comprises: a speech coding portion including a speech recognition system responsive to the input speech signal and having a word vocabulary associated therewith, the speech recognition system recognizing the input speech signal in accordance with the vocabulary and generating phonetic tokens, such as at least one sequence of lefemes, representative of the input speech signal; a channel, responsive to the at least one sequence of lefemes, for transmitting and/or storing the at least one sequence of lefemes; and a speech synthesizing portion, responsive to the transmitted/stored sequence of lefemes, for generating a synthesized speech signal which is representative of the input speech signal provided by the system user using the at least one sequence of lefemes. The speech recognition system preferably generates acoustic parameters from the input speech signal which include voice characteristics of the system user. The speech coding system also preferably comprises a labeler which processes the input speech signal including words uttered by the system user which are not in the word vocabulary associated with the speech recognition system, the labeler generating phonetic tokens, such as at least one sequence of lefemes, optimally representative of the input speech signal. The sequence of lefemes from the labeler and the speech recognition portion are compared, for each speech segment, and the sequence most similar to the input speech is selected for transmission/storage. The speech synthesizing portion of the system preferably performs speech synthesis using pre-enrolled phonetic sub-units or tokens.

38 Claims, 5 Drawing Sheets

SPEECH CODING VIA SPEECH RECOGNITION AND SYNTHESIS BASED ON PRE-ENROLLED PHONETIC TOKENS

BACKGROUND OF THE INVENTION

The present invention relates to speech coding systems and methods and, more particularly, to systems and methods for speech coding via speech recognition and synthesis based on pre-enrolled phonetic tokens.

It is known that conventional speech coders generally fall into two classes: transform coders and analysis-by-synthesis coders. With respect to transform coders, a speech signal is transformed using an invertible or pseudo-invertible transform, followed by a lossless and/or a lossy compression procedure. In a analysis-by-synthesis coder, a speech signal is used to build a model, often relying on speech production models or on articulatory models, and the parameters of the models are obtained by minimizing a reconstruction error.

All of these conventional approaches code the speech signal by trying to minimize the perturbation of the waveform for a given compression rate and to hide these distortions by taking advantage of the perceptual limitations of the human auditory system. However, because the minimum of information necessary to reconstruct the original waveform is quite extensive when coding is performed in the above-mentioned conventional methods, such conventional systems are limited in data bandwidth since it is prohibitive, in time and/or cost, to code so much data. Such conventional systems attempt to minimize the information necessary to reconstruct the original speech waveform without examining the content of the message. In the case of a analysis-by-synthesis coder, such a speech coder exploits the property of speech production but it too does not take into account any information about what is being spoken.

SUMMARY OF THE INVENTION

It is one object of the present invention to provide a system and method capable of transcribing the content of a speech utterance and, if desirable, the characteristics of the speaker's voice, and to transmit and/or store the content of this utterance as portions of speech in the form of phonetic tokens, as will be explained.

It is a further object of the present invention to provide a system and method for speech transcription which uses classical large vocabulary speech recognition on words within the vocabulary and an unknown vocabulary labeling technique for words outside the vocabulary.

In one aspect, the present invention consists of a speech coding system used to optimally code speech data for storage and/or transmission. Other handling and applications (i.e., besides transmission or storage) for the data coded according to the invention may be contemplated by those skilled in the art, given the teachings herein. To accomplish this novel coding scheme, words included within speech utterances are recognized with a large vocabulary speech recognizer. The words are associated with phonetic tokens preferably in the form of optimal sequences of lefemes, among all the possible baseforms (i.e., phonetic transcriptions). Unreliable or unknown words are detected with a confidence measure and associated with the phonetic tokens obtained via a labeler capable of decoding unknown vocabulary words, as will be explained. The phonetic tokens (e.g., sequences of lefemes) are preferably transmitted and/or stored along with acoustic parameters extracted from the speaker's utterances. This coded data is then provided to a receiver side in order to synthesize the speech using a synthesis technique employing pre-enrolled phonetic tokens, as will be explained. If, for example, speaker dependent speech recognition is employed to code the data, then the synthesized speech generated at the receiver side may also be speaker dependent, although it doesn't have to be. Speaker-dependent synthesis allows for more natural conversation with a voice sounding like the speaker on the input side. Speaker-dependent recognition essentially improves the accuracy of the initial tokens sent to the receiver. Also, if speaker-dependent recognition is employed, the identity of the speaker (or the class for class-dependent recognition) is preferably determined and transmitted and/or stored, along with transcribed data. However, speaker-independent speech recognition may be employed.

Advantageously, the amount of information to transmit and/or store (i.e., the phonetic tokens and, if extracted, the acoustic parameters of the speaker) is minimal as compared to conventional coders. It is to be appreciated that the coding systems and methods of the invention disclosed herein represent a significant improvement over conventional coding in terms of the amount of data capable of being transmitted and/or stored given a particular transmission channel bandwidth and/or storage capacity.

On the receiver side, the phonetic tokens (preferably, the sequences of lefemes) and the speaker characteristics, if originally transmitted and/or stored, are used to synthesize the utterance using a method of synthesis based on pre-enrolled phonetic tokens.

It should be understood that the term "phonetic token" is not to be limited to the exemplary types mentioned herein. That is, the present invention teaches the novel concept of coding speech in the form of a transcription which is made up of phonetic portions of the speech itself, i.e., sub-units or units. The term "token" is used to represent a sub-unit or unit. Such tokens may include, for example, phones and, in a preferred embodiment, a sequence of lefemes, which are portions of phones in a given speech context. In fact, in some cases a token could be an entire word, if the word consists of only one phonetic unit. Nonetheless, the following detailed description hereinafter generally refers to lefemes but uses such other terms interchangeably in describing preferred embodiments of the invention. It is to be understood that such terms are not intended to limit the scope of the invention but rather assist in appreciating illustrative embodiments presented herein.

In addition, in a preferred embodiment, the phonetic tokens which are enrolled and used in speech recognition and speech synthesis include the sound(s) present in the background at the time when the speaker enrolled, thus, making the synthesized speech output at the receiver side more realistic. That is, the synthesized speech is generated from background-dependent tokens and, thus, more closely represents the input speech provided to the transmission section. Alternatively, by using phonetic tokens, it is possible to artificially add the appropriate type of background noise (at a low enough level) to provide a special effect (e.g., background sound) at the synthesizer output that may not have necessarily been present at the input of transmission side.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
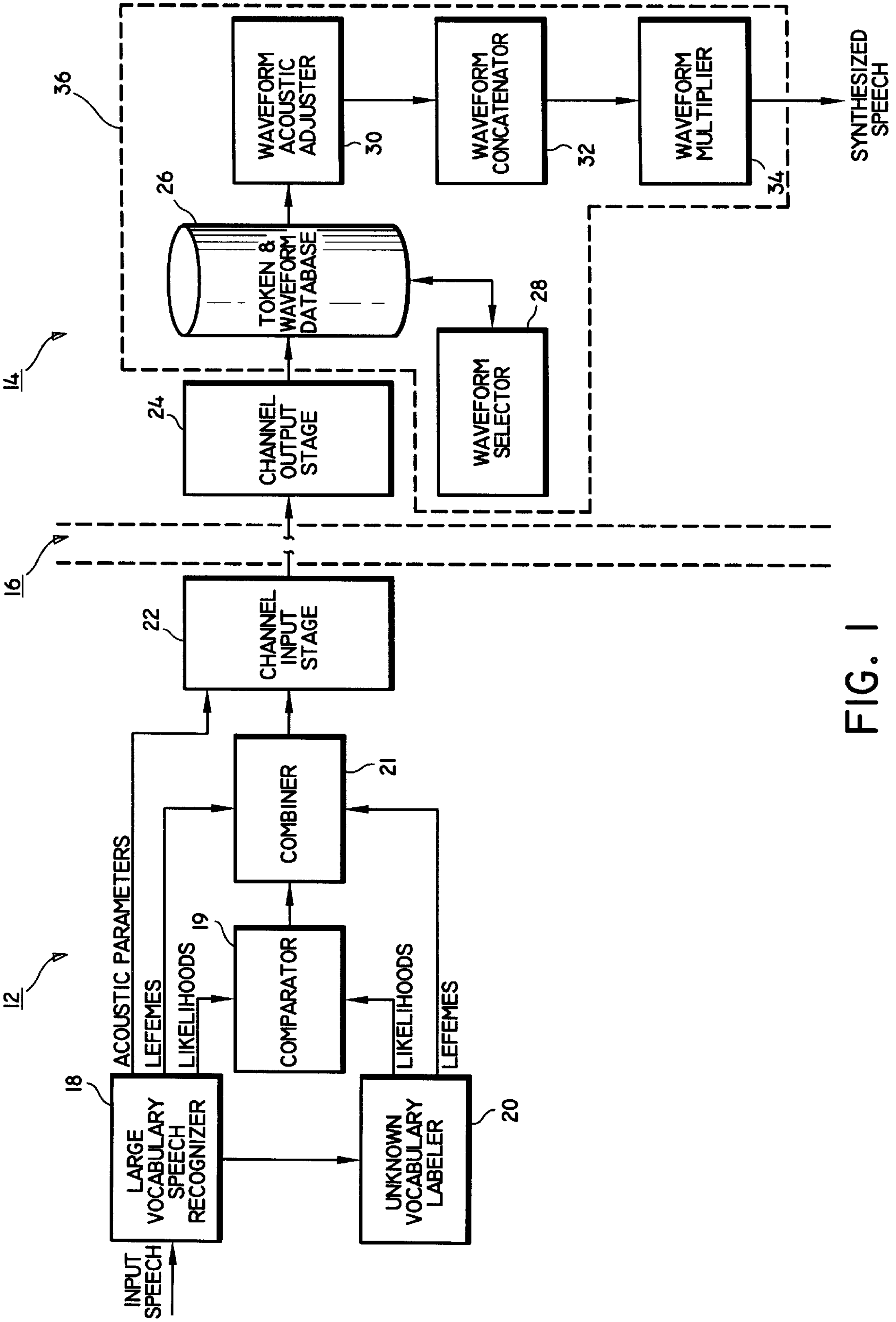
FIG. 1 is a block diagram of a speech coding system according to the present invention.

Referring to FIG. 1, a preferred embodiment of a speech coding system 10 according to the present invention is shown. The speech coder 10 includes a transmission section 12 and a receiver section 14, which are operatively coupled to one another by a channel 16. In general, the transmission section 12 of the speech coder 10 transcribes the content of speech utterances provided thereto by a speaker (i.e., system user), in such a manner as will be explained, such that only portions of speech in the form of phonetic tokens representative of a transcription of the speech uttered by the speaker are provided to the channel 16 either directly or, for security purposes, in an encoded (e.g., encrypted) form. Also, if desirable, the transmission section 12 extracts some acoustic characteristics of the speaker's voice (e.g., energy level, pitch, duration) and provides them to the channel 16 directly or in encoded form. Still further, the identity of the speaker is also preferably provided to the channel 16 if speaker-dependent recognition is employed. Likewise, if class-dependent recognition is employed, then the identity of a particular class is provided to the channel 16. Such identification of speaker identity may be performed in any conventional manner known to those skilled in the art, e.g., identification password or number provided by speaker, speaker word comparison, etc. However, speaker identification may also be accomplished in the manner described in U.S. Ser. No. 08/788,471 (docket no. YO996-188) filed on Jan. 28, 1997, entitled "Text-independent Speaker Recognition for Command Disambiguity and Continuous Access Control", which is commonly assigned and the disclosure of which is incorporated herein by reference.

Text-independent speaker recognition provides an advantage in that the actual accuracy of the spoken response and/or words uttered by the user is not critical in making an identity claim, but rather, a transparent (i.e. background) comparison of acoustic characteristics of the user is employed to make the identity claim. Further, if the speaker is unknown, it is still possible to assign him or her to a class of speakers. This may be done in any conventional manner; however, one way of accomplishing this is described in U.S. Ser. No. 08/787,031 (docket no. YO996-018), entitled: "Speaker Classification for Mixture Restriction and Speaker Class Adaptation", the disclosure of which is incorporated herein by reference.

It is to be appreciated that the actual function of the channel 16 is not critical to the invention and may vary depending on the application. For instance, the channel 16 may be a data communications channel whereby the transcribed speech (i.e., transcription), and acoustic characteristics, generated by the transmission section 12 may be transmitted across a hardwired (e.g., telephone line) or wireless (e.g., cellular network) communications link to some destination (e.g., the receiver section 14). Channel 16 may also be a storage channel whereby the transcription, and acoustic characteristics, generated by the transmission section 12 may be stored for some later use or later synthesis. In any case, the amount of data representative of the speech utterances to be transmitted and/or stored is minimal, thus, reducing the data channel bandwidth and/or the storage capacity necessary to perform the respective functions.

Further, other processes may performed on the transcription and acoustic characteristics prior to transmission and/or storage of the information with respect to said channel. For instance, the transcription of the speech and acoustic characteristics may be subjected to a compression scheme whereby the information is compressed prior to transmission and then subjected to a reciprocal decompression scheme at some destination. Still further, the transcription and acoustic characteristics generated by the transmission section 12 may be encrypted prior to transmission and then decrypted at some destination. Other types of channels and pre-transmission/storage processes may be contemplated by those of ordinary skill in the related art, given the teachings herein. Also, the above described pre-transmission/storage processes may be performed on either the transcription or the acoustic characteristics, rather than on both.

Nonetheless, the transcription is provided to the receiver section 14 from the channel 16. At the receiver section 14, the transmitted sequences of lefemes and, if also extracted, the speaker's acoustic characteristics, are used to synthesize the speech utterances provided by the speaker at the transmission section 12 by preferably employing a synthesis technique using pre-enrolled tokens. These pre-enrolled tokens (e.g., phones, lefemes, phonetic units or sub-units, etc.) are previously stored at the receiver side of the coding system during an enrollment phase. In a speaker-dependent system, the actual speaker who will provide speech at the transmission side enrolls the phonetic tokens during a training session. In a speaker-independent system, training speakers enroll the phonetic tokens during a training session in order provide a database of tokens which attempt to capture the average statistics across the several training speakers. Preferably, the receiver side of the present invention provides for a speaker-dependent token database and a speaker-independent database. This way, if a speaker at the transmission side has not trained-up the system, synthesis at the receiver side can rely on use of the speaker-independent database. A preferred synthesis process using the pre-enrolled tokens will be explained later in more detail.

The transmission section 12 preferably includes a large vocabulary speech recognizer 18, an unknown vocabulary labeler 20, an acoustic likelihood comparator 19, a combiner 21, and a channel input stage 22. The speech recognizer 18 and the labeler 20 are operatively coupled to one another and to the comparator 19 and the combiner 21. The comparator 19 is operatively coupled to the combiner 21, while the combiner 21 and the speech recognizer 18 are operatively coupled to the channel input stage 22. The channel input stage 22 preferably performs the pre-transmission/storage functions of compression, encryption and/or any other preferred pre-transmission or pre-storage feature desired, as mentioned above. The channel input stage 22 is operatively coupled to the receiver section 14 via the channel 16. The receiver section 14 preferably includes a channel output stage 24 which serves to decompress, decrypt and/or reverse any processes performed by the channel input stage 22 of the transmission section 12. The receiver section 14 also preferably includes a token/waveform database 26, operatively coupled to the channel output stage 24, and a waveform selector 28 and a waveform acoustic adjuster 30, each of which are operatively coupled to the token/waveform database 26. Further, the receiver section 14 preferably includes a waveform concatenator 32, operatively coupled to the waveform acoustic adjuster 30, and a waveform multiplier 34, operatively coupled to the waveform concatenator 32. Cumulatively, the token/waveform database 26, the waveform selector 28, the waveform acoustic adjuster 30, the waveform concatenator 32 and the waveform multiplier 34 form a speech synthesizer 36. Given the above-described preferred connectivity, the operation of the speech coding system 10 will now be provided.

Advantageously, in a preferred embodiment, the present invention combines a large vocabulary speech recognizer 18, an unknown vocabulary labeler 20 and a synthesizer 36, employing pre-enrolled tokens, to provide a relatively simple but extremely low bit rate speech coder 10. The general principles of operation of such a speech coder are as follows.

Figure 2:
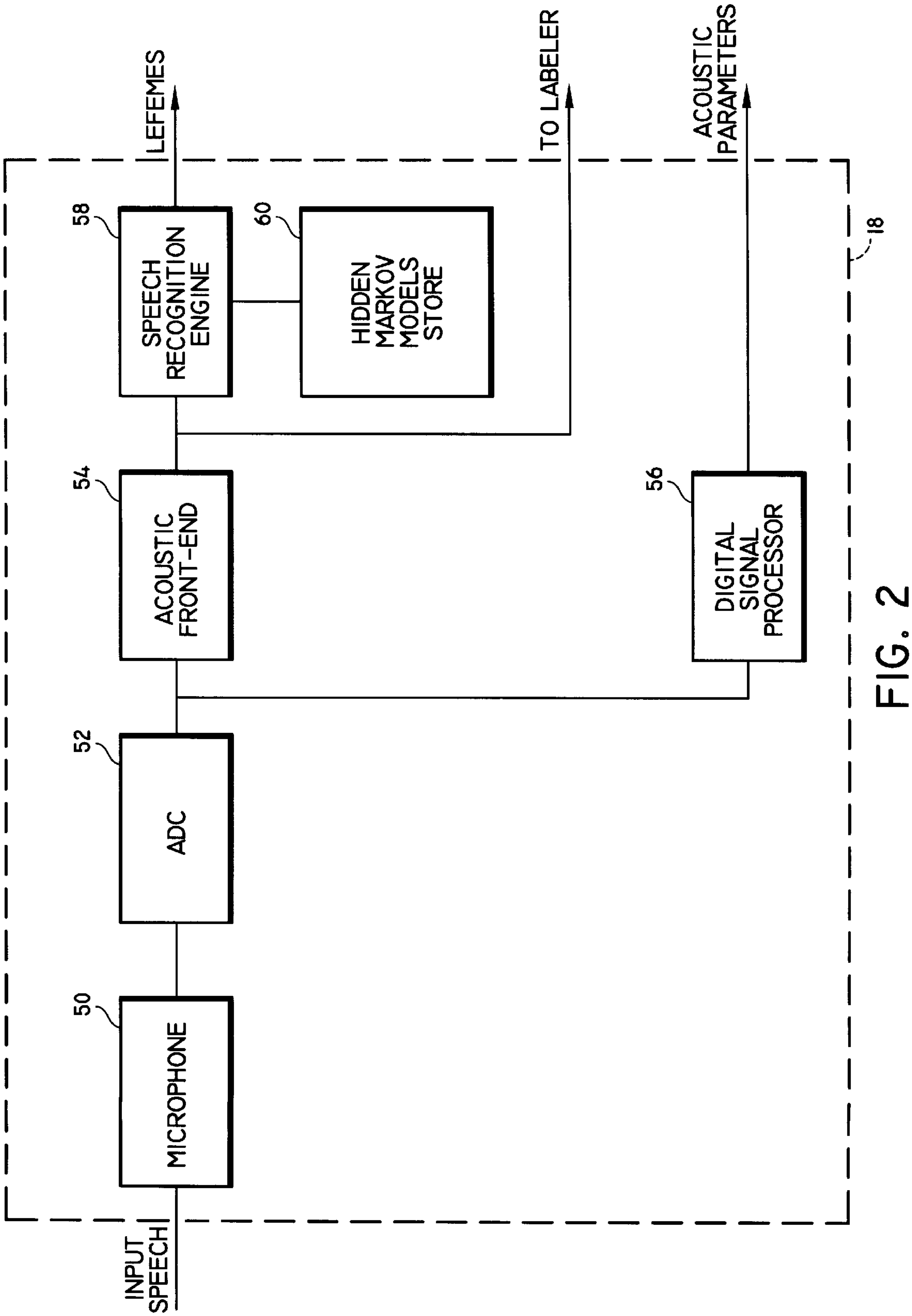
FIG. 2 is a block diagram of a speech recognizer for use by the speech coding system of FIG. 1.

Input speech is provided to the speech recognizer 18. An exemplary embodiment of a speech recognizer is shown in FIG. 2. The input speech is provided by a speaker (system user) speaking into a microphone 50 which converts the audio signal to an analog electrical signal representative of the audio signal. The analog electrical signal is then converted to digital form by an analog-to-digital converter (ADC) 52 before being provided to an acoustic front-end 54. The acoustic front-end 54 extracts feature vectors, as is known, for presentation to the speech recognition engine 58. The feature vectors are then processed by the speech recognition engine 58 in conjunction with the Hidden Markov Models (HMMs) stored in HMMs store 60.

In accordance with the invention, rather than the speech recognition engine 58 outputting a recognized word or words representing the word or words uttered by the speaker, the speech recognition engine 58 advantageously outputs a transcription of the input speech in the form of portions of speech or phonetic tokens. In accordance with a preferred embodiment, the tokens are in the form of acoustic phones in their appropriate speech context. As previously mentioned, these context-dependent phones are referred to as lefemes with a string of context-dependent phones being referred to as a sequence of lefemes. As illustrated in FIG. 2, the speech recognition engine 58 is preferably a classical large vocabulary speech recognition engine which employs HMMs in order to extract the sequence of lefemes attributable to the input speech signal. Also, an acoustic likelihood is associated with each sequence of lefemes generated by the speech recognizer 18 for the given input speech provided thereto. As is known, the acoustic likelihood is a probability measure generated during decoding which represents the likelihood that the sequence of lefemes generated for a given segment (e.g., frame) of input speech is actually an accurate representation of the input speech. A classical large vocabulary speech recognizer which is appropriate for generating the sequences of lefemes is disclosed in any one of the following articles: L. R. Bahl et al., "Robust Methods for Using Context-dependent Features and Models in a Continuous Speech Recognizer," Proc. ICASSP, 1994; P. S. Gopalakrishnan et al., "A Tree Search Strategy for Large Vocabulary Continuous Speech Recognition," Proc. ICASSP, 1995; L. R. Bahl et al., "Performance of the IBM Large Vocabulary Speech Recognition System on the ARPA Wall Street Journal Task," Proc. ICASSP, 1995; P. S. Gopalakrishnan et al., "Transcription of Radio Broadcast News with the IBM Large Vocabulary Speech Recognition System," Proc. Speech Recognition Workshop, DARPA, 1996. One of ordinary skill in the art will contemplate other appropriate speech recognition engines capable of accomplishing the functions of the speech recognizer 18 according to the present invention.

As mentioned previously, the transmission section 12 may, in addition to the sequence of lefemes, transmit a speaker's acoustic characteristics or parameters such as energy level, pitch, duration and/or other acoustic parameters that may be desirable for use in realistically synthesizing the speaker's utterances at the receiver side 14. Still referring to FIG. 2, in order to extract such acoustic parameters from the speaker's utterances, the speech is input to a digital signal processor (DSP) 56 wherein the desired acoustic parameters are extracted from the input speech. Any known DSP may be employed to extract the speech characteristics of the speaker and, thus, the particular type of DSP used is not critical to the invention. While a separate DSP is illustrated in FIG. 2, it should be understood that the function of the DSP 56 may be alternatively performed by the acoustic front-end 54 wherein the front-end extracts the additional speaker characteristics as well as the feature vectors.

Referring again to FIG. 1, for words which are in the vocabulary of the speech recognizer 18, the preferred baseform (i.e., common sequence of lefemes) is extracted from the dictionary of words associated with the large vocabulary. Among all the possible baseforms, the baseform which aligns optimally to the spoken utterance is selected. Unknown words (i.e., out of the vocabulary), which may occur between well recognized words, are detected by poor likelihoods or confidence measures returned by the speech recognizer 18. Thus, for words out of the vocabulary, the unknown vocabulary labeler 20 is employed. However, it is to be understood that the entire input speech sample is preferably decoded by both the speech recognizer 18 and the labeler 20 to generate respective sequences of lefemes for each speech segment. Even when words are decoded, they can be converted into a stream of lefemes (e.g., baseform of the word). Multiple baseforms can exist for a given word, but the decoder (recognizer 18 or labeler 20), will provide the most probable.

As a result, as shown in FIG. 2, the feature vectors extracted from the input speech by the acoustic front-end 54 are also sent to the labeler 20. The labeler 20 also extracts the optimal sequence of lefemes (rather than extracting words or sentences) from the input speech signal sent thereto from the speech recognizer 18. Similar to the speech recognition engine 58, an acoustic likelihood is associated with each sequence of lefemes generated by the labeler 20 for the given input speech provided thereto. Such a labeler, as is described herein, is referred to as a "ballistic labeler". A labeler which is appropriate for generating the optimal sequences of lefemes for words not in the vocabulary of the speech recognizer 18 is disclosed in U.S. patent application Ser. No. 09/015,150, filed on Jan. 29, 1998, entitled: "Apparatus And Method For Generating Transcriptions From Enrollment Utterances", which is commonly assigned and the disclosure of which is incorporated herein by reference. One of ordinary skill in the art will contemplate other appropriate methods and apparatus for accomplishing the functions of the labeler 20. For instance, in a simple implementation of a ballistic labeler, a regular HMM-based speech recognizer may be employed with lefemes as vocabulary and trees and uni-grams, bi-grams and tri-grams of lefemes built for a given language.

The labeler disclosed in above-incorporated U.S. patent application Ser. No. 09/015,150 is actually a part of apparatus for generating a phonetic transcription from an acoustic utterance which performs the steps of constructing a trellis of nodes, wherein the trellis may be traversed in the forward and backward direction. The trellis includes a first node corresponding to a first frame of the utterance, a last node corresponding to the last frame of the utterance, and other nodes therebetween corresponding to frames of the utterance other than the first and last frame. Each node may be transitioned to and/or from any other node. Each frame of the utterance is indexed, starting with the first frame and ending with the last frame, in order to find the most likely predecessor of each node in the backward direction. Then, the trellis is backtracked through, starting from the last frame and ending with the first frame to generate the phonetic transcription.

Accordingly, the speech recognizer 18 and the labeler 20 each respectively produce sequences of lefemes from the input utterance. Also, as previously mentioned, each sequence of lefemes has an acoustic likelihood associated therewith. Referring again to FIG. 1, the acoustic likelihoods associated with each sequence output by the speech recognizer 18 and the labeler 20 are provided to the comparator 19. Further, the sequences, themselves, are provided to the combiner 21. Next, the acoustic likelihoods associated with the speech recognizer 18 and the labeler 20 are compared for the same segment (e.g., frame) of input speech. The higher of the two likelihoods is identified from the comparison and a comparison message is generated which is indicative of which likelihood, for the given segment, is the highest. One of ordinary skill in the art will appreciate that other features associated with the sequences of lefemes (besides or in addition to acoustic likelihood) may be used to generate the indication represented by the comparison message.

A comparison message is provided to the combiner 21 with the sequence of lefemes from the speech recognizer 18 and the labeler 20, for the given segment. The combiner 21 then either selects the sequence of lefemes from the speech recognizer 19 or the labeler 20 for each segment of input speech, depending on the indication from the comparison message as to which sequence of lefemes has a higher acoustic likelihood. The selected lefeme sequences from sequential segments are then concatenated, i.e., linked to form a combined sequence of lefemes. The concatenated sequences of lefemes are then output by the combiner 21 and provided to the channel input stage 22, along with the additional acoustic parameters (e.g., energy level of the lefemes, duration and pitch) from the speech recognizer 18. The lefeme sequences and additional acoustic parameters are then transmitted by the channel input stage 22 (after lossless compression, encryption, and/or any other pre-transmission/storage process, if desired) to the channel 16. Also, as mentioned, the identity of the speaker (or class of the speaker) may be determined by the speech recognizer 18 and provided to the channel 16.

The sequences of lefemes are then received by the receiver section 14, from the channel 16, wherefrom a speech signal is preferably synthesized by employing a pool of pre-enrolled tokens or lefemes obtained during enrollment of a particular speaker (speaker-dependent recognition) and/or of a pool of speakers (speaker-independent recognition). As previously mentioned, the database of tokens preferably includes both tokens enrolled by the particular speaker and a pool of speakers so, if for some reason, a lefeme received from the channel 16 cannot be matched with a previously stored lefeme provided by the actual speaker, a lefeme closest to the received lefeme may be selected from the pool of speakers and used in the synthesis process.

Nonetheless, after the channel output stage 24 decompresses, decrypts and/or reverses any pre-transmission/storage processes, the received sequences of lefemes are provided to the token/waveform database 26. The token/waveform database 26 contains phonetic sub-units or tokens, e.g., phones with, for instance, uni-grams, bi-grams, tri-grams, n-grams statistics associated therewith. These are the same phonetic tokens that are used by the speech recognizer 18 and the ballistic labeler 20 to initially form the sequences of lefemes to be transmitted over the channel 16. That is, at the time the speaker or a pool of speakers trains-up the speech recognition system on the transmission side, the training data is used to form the sub-units or tokens stored in the database 26. In addition, the database 26 also preferably contains the acoustic parameters or characteristics, such as energy level, duration, pitch, etc., extracted from the speaker's utterances during enrollment.

It is to be appreciated that a speech synthesizer suitable for performing the synthesis functions described herein is disclosed in U.S. patent application Ser. No. 08/821,520, filed on Mar. 21, 1997, entitled: "Speech Synthesis Based On Pre-enrolled Tokens", which is commonly assigned and the disclosure of which is incorporated herein by reference.

Generally, on the receiver side, the synthesizer 36 concatenates the waveformns corresponding to the phonetic sub-units selected from the database 26 which match the baseformn and associated parameters (including dilation, rescaling and smoothing of the boundaries) of the sequences of lefemes received from the transmission section 12. The waveforms, which form the synthesized speech signal output by the synthesizer 36, are also stored in the database 26.

The synthesizer 36 performs speech synthesis on the sequences of lefemes received from the channel 16 employing the lefemes or tokens which have been previously enrolled in the system and stored in the database 26. As previously mentioned, the enrollment of the lefemes is accomplished by a system user uttering the words in the vocabulary and the system matching them with their appropriate baseforms. The speech coder 10 records the spoken word, labels the word with a set of phonetic sub-units, as mentioned above, using the speech recognizer 18 and the labeler 20. Additional information like duration of the middle phone and energy level are also extracted. This process is repeated for each group of names or words in the vocabulary. During generation of the initial phonetic sub-units used to form the sequences of lefemes on the transmission side and also stored by the database 26, training speech is spoken by the same speaker who will use the speech coder (the speech on the receiver side would sound like this speaker) or a pool of speakers. The associated waveforms are stored in the database 26. Also, the baseforms (phonetic transcriptions) of the different words are stored. These baseforms are either obtained by manual transcriptions or dictionary or using the labeler 20 for unknown words. By going over the database 26, the sub-unit lefemes (phones in a given left and right context) are associated to one or more waveforms (e.g., with different durations and/or pitch). This is accomplished by the waveform selector 28 in cooperation with the database 26. Pronunciation rules (or simply, most probable bi-phones) are also used to complete missing lefemes with bi-phones (left or right) or uni-phones.

Subsequent to the system training described above and during actual use of the system, a user speaks a word in the vocabulary (i.e., previously enrolled words), recognition of the phone or sub-units sequence is done, as explained above, and then the output is transmitted to a synthesizer 36 on the receiver side. The receiving synthesizer 36 uses the database 26 having similar sub-units trained by the same speaker (speaker-dependent) or by a unique speaker (speaker-independent). The determination of whether to employ a speaker-dependent or speaker-independent coder embodiment depends on application. Speaker-dependent systems are preferred when the user will enroll enough speech so that a significant amount of speaker-dependent lefemes will be collected. However, in a preferred embodiment of the invention, the database 26 contains speaker-dependent lefemes and speaker-independent lefemes. Advantageously, whenever a missing lefeme is met (that is, a pre-stored speaker-dependent lefeme with similar acoustic parameters cannot be matched to a received lefeme), the system will backoff to the corresponding speaker-independent portion of the database 26 with similar features (duration, pitch, energy level).

Thus, returning to the use of a trained speech coder 10, after the user speaks, the speech recognizer 18 and the labeler 20 match the optimal enrolled baseform sequence to the spoken utterances, as explained above in detail. This is done at the location of the transmission section 12. The associated sequences of lefemes are transmitted to the database 26 on the receiver side. The waveform selector 28 extracts the corresponding sequence from the database 26, trying to substantially match the duration and pitch of the enrolling utterance.

The identity of the speaker or the class associated with him or her, preferably received by the synthesizer 36 from the transmission section 12, is used to focus the matching process to the proper portion of the database, i.e., where the corresponding pre-stored tokens are located. Whenever a missing lefeme is met, the closest lefeme from bi-phone or uni-phone models or from another portion of the database (e.g., speaker-independent database) is used.

The associated waveforms, which correspond to the optimally matching sequence selected from the database 26, are re-scaled by the waveform acoustic adjuster 30, that is, the different waveforms are adjusted (energy level, duration, etc.), before concatenation as described in the above-incorporated U.S. patent application Ser. No. 08/821,520, entitled: The energy level is set to the value estimated during enrollment if the word was enrolled by the user or at the level of the recognized lefeme otherwise. The level is the level of the recognized lefeme when it was not enrolled by this speaker (speaker-independent system). The successive lefemes waveforms are thereafter concatenated by the waveform concatenator 32. Further, discontinuities and spikes are avoided by pre-multiplying the concatenated waveforms with overlapping window functions. Thus, if there are two concatenated waveforms generated from the database 26, then each waveform, after being converted from digital to analog form by a digital-to-analog converter (not shown), may be respectively multiplied by the two overlapping window functions $w_1(t)$ and $w_2(t)$ such that:

$$w_1(t)+w_2(t)=1,$$

as is described in the above-incorporated U.S. patent application Ser. No. 08/821,520 entitled: The resulting multiplied waveforms thus form a synthesized speech signal representative of the speech originally input by the system user at the transmission side. Such synthesized speech signal may then be provided to a speaker device or some other system or device responsive to the speech signal. One of ordinary skill in the art will appreciate a variety of applications for the synthesized speech signal.

It is to be appreciated that, while a preferred embodiment of a speech synthesizer 36 has been described above, other forms of speech synthesizers may be employed in accordance with the present invention. For example, but not intended to be an exhaustive list, the sequence of lefemes may be input from the channel 16 to a synthesizer which uses phonetic rules or HMMs to synthesize speech. For that matter, other forms of speech recognizers for transcribing known and unknown words may be employed to generate sequences of lefemes in accordance with the present invention.

Also, as previously mentioned, the sequence of lefemes generated and output by the transmission section 12 and generated and pre-enrolled for use by the synthesizer may be background-dependent. In other words, they may preferably contain background noise (e.g., music, ambient noise) which exists at the time the speaker provides speech to the system (real-time and enrollment phase). That is, the lefemes are collected under such acoustic conditions and when used to synthesize the speech, the feeling of a full acoustic transmission, similar to speaker-dependent synthesis, is provided. Thus, when the speech is synthesized at the output of the system, the speech sounds more realistic and representative of the input speech. Alternatively, background noise tokens and waveforms (e.g., not necessarily containing the subject speech) may be generated and stored in the database 26 and selected by waveform selector 28 to be added to the speech (subject speech) received from the channel 16. In this manner, special audio effects can be added to the speech (e.g., music, ambient noise) which did not necessarily exist at the input side of the transmission section 12. Such background tokens and waveforms are generated and processed in the same manner as the speech tokens and waveforms to form the synthesized speech output by the receiver 14.

Figure 3A:
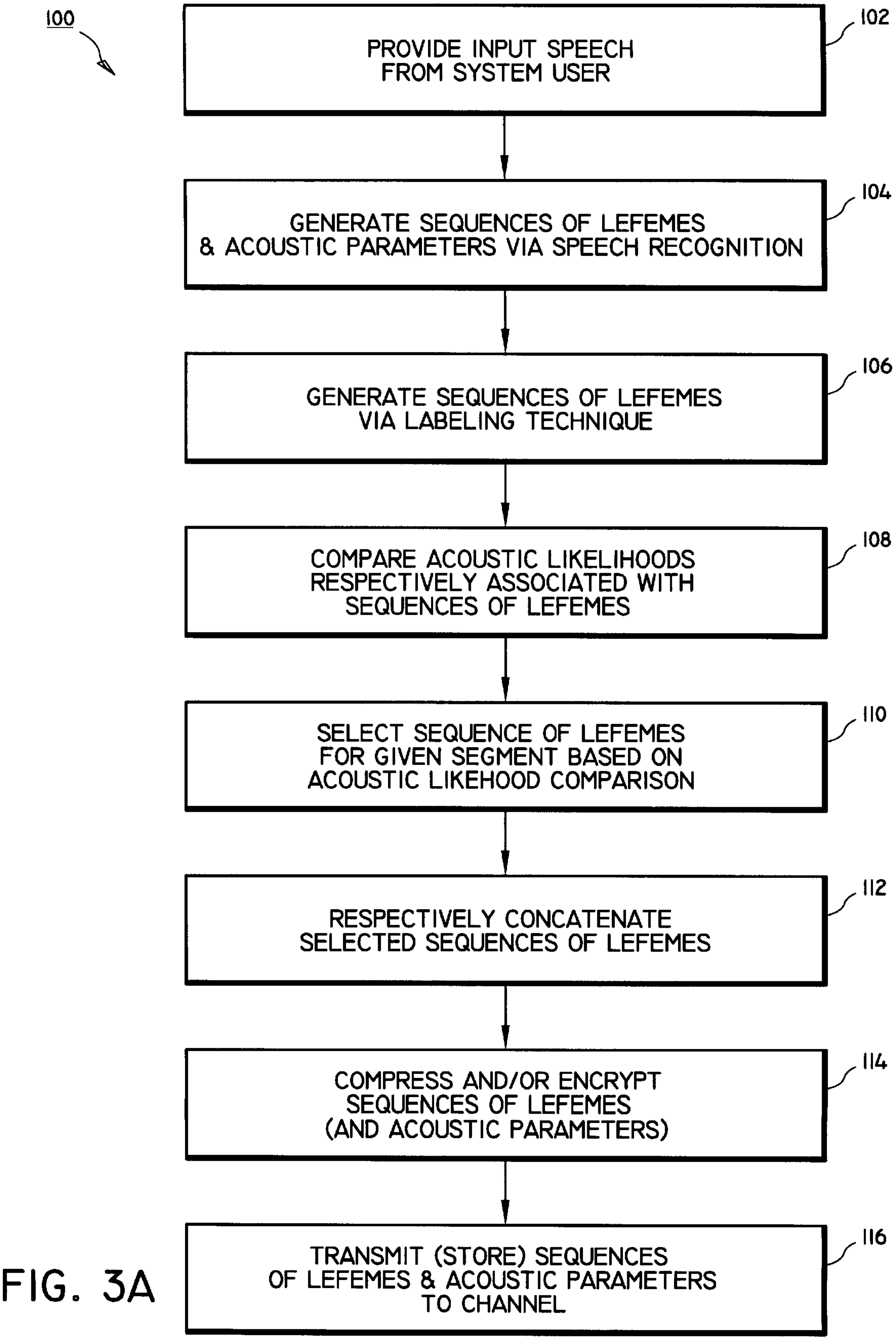
FIGS. 3A and 3B are flow charts of a speech coding method according to the present invention.
Figure 3B:
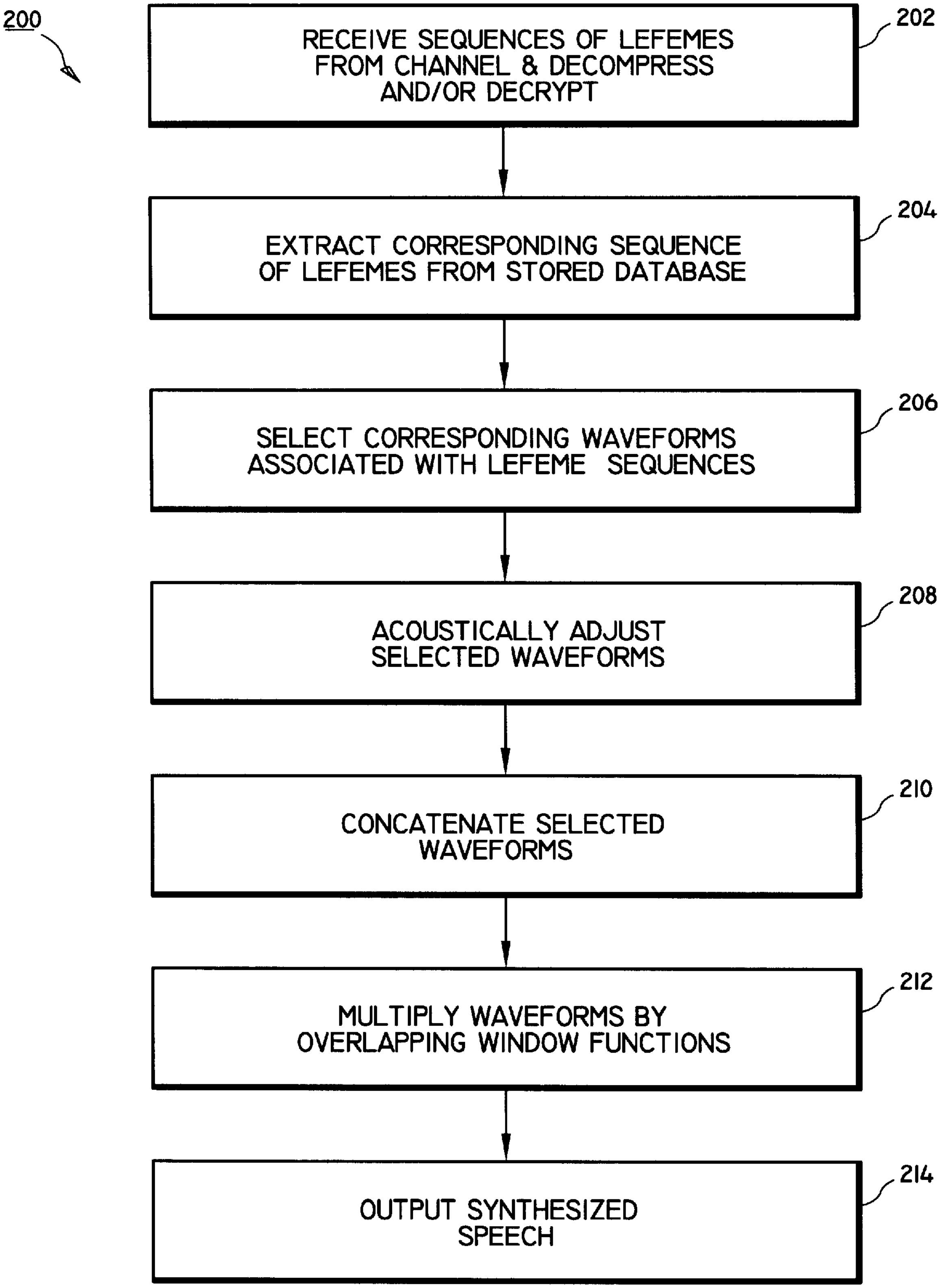

Referring now to FIGS. 3A and 3B, a preferred embodiment of a method for speech coding according to the invention is shown. Particularly, FIG. 3A shows a preferred method 100 of transcribing input speech prior to transmission/storage, while FIG. 3B shows a preferred method 200 of synthesizing the transmitted/stored speech.

The preferred method 100 shown in FIG. 3A includes providing input speech from the system user (step 102) and then generating sequences of lefemes and acoustic parameters via large vocabulary speech recognition (step 104) therefrom. Further, sequences of lefemes are also generated via labeling capable of decoding unknown words, i.e., words not in the speech recognition vocabulary (step 106). Next, acoustic likelihoods associated with the sequences of lefemes respectively generated by large vocabulary speech recognition and labeling are compared (step 108). For each given segment of input speech (e.g., frame), the sequence of lefemes having the highest acoustic likelihood is selected (step 110). Next, the selected sequences of lefemes are respectively concatenated (step 112), and if desired, compressed and/or encrypted (step 114). The acoustic parameters may also be compressed and/or encrypted. Then, the lefeme sequences and acoustic parameters are transmitted and/or stored (step 116).

The preferred method 200 shown in FIG. 3B includes receiving the lefeme sequences (and acoustic parameters) and decompressing and/or decrypting them, if necessary (step 202). Then, the corresponding lefemes are extracted from the stored database (step 204), preferably, utilizing the acoustic parameters to assist in the matching process. The corresponding waveforms associated with the lefeme sequences are then selected (step 206). The selected waveforms are then acoustically adjusted (step 208) also utilizing the acoustic parameters, concatenated (step 210) and multiplied by overlapping window functions (step 212). Lastly, the synthesized speech, formed from the waveforms, is output (step 214).

It is to be appreciated that, while the main functional components illustrated in FIGS. 1 and 2 may be implemented in hardware, software or a combination thereof, the main functional components may represent functional software modules which may be executed on one or more appropriately programmed general purpose digital computers, each having a processor, memory and input/output devices for performing the functions. Of course, special purpose processors and hardware may be employed as well. Nonetheless, the block diagrams of FIGS. 1 and 2 may also serve as a programming architecture, along with FIGS. 3A and 3B, for implementing preferred embodiments of the present invention. Regarding the channel between the transmission and receiver sections, one of ordinary skill in the art will contemplate appropriate ways of implementing the features (e.g., compression, encryption, etc.) described herein.

Figure 4:
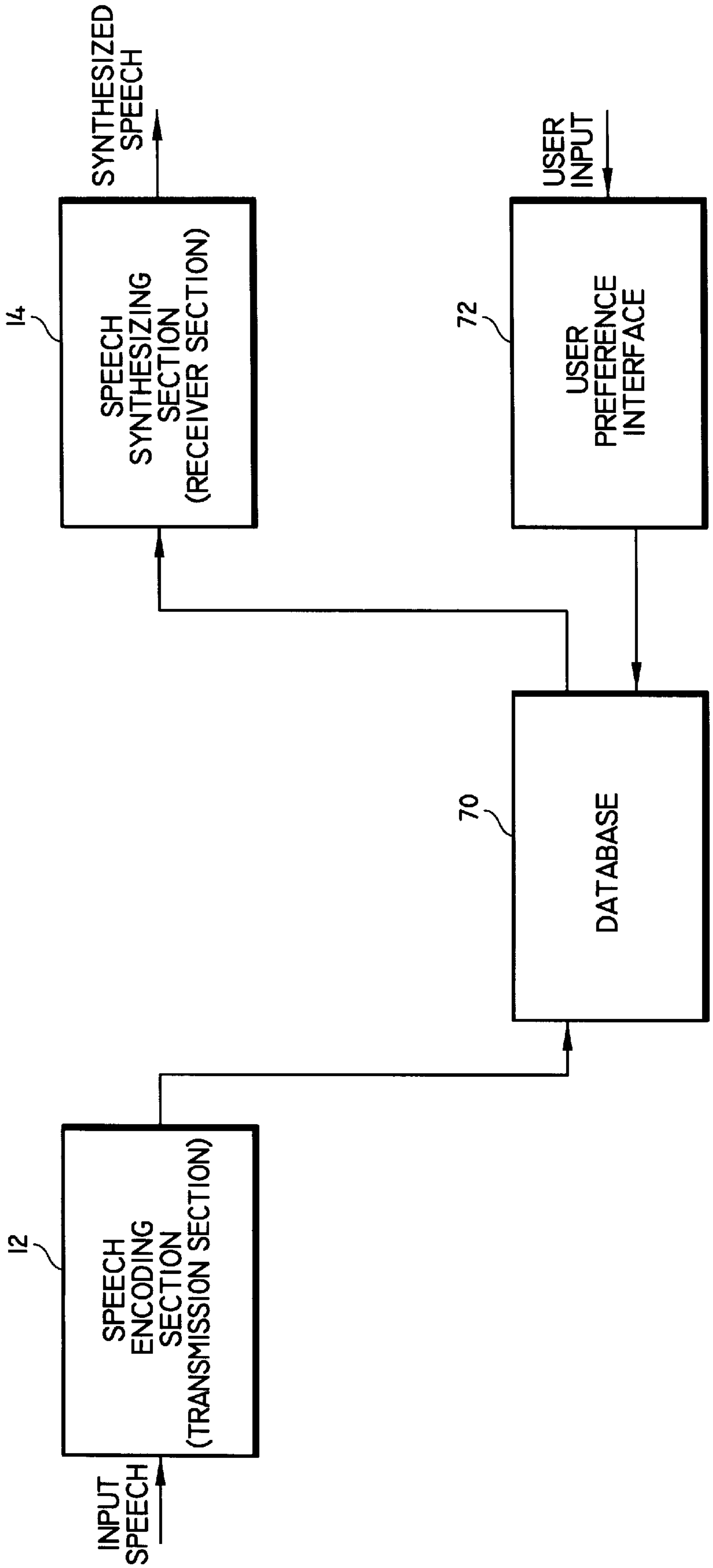
FIG. 4 is a block diagram illustrating an exemplary application of a speech coding system according to the present invention.

Referring now to FIG. 4, an exemplary application of a speech coding system according to the present invention is shown. Specifically, FIG. 4 illustrates an application employing an internet phone or personal radio in connection with the present invention. It is to be appreciated that block 12, denoted as speech encoding section, is identical to the transmission section 12 illustrated in FIG. 1 and described in detail herein. Likewise, block 14, denoted as speech synthesizing section, is identical to receiver section 14 illustrated in FIG. 1 and described in detail herein. A database 70 is operatively coupled between the speech encoding section 12 and the speech synthesizing section 14. A user preference interface 72 is operatively coupled to the database 70.

Similar to news provider services like "PointCast", where a subscriber subscribes to some type of news service (such as business news) and the subscriber is able to retrieve this information at his leisure, FIG. 4 illustrates an application of the present invention using this so-called "push technology". By way of example, a business news service provider may read aloud business news off a wire service of some sort and such speech is then input to the speech encoding section 12 of FIG. 4. As explained in detail herein, the speech encoding section (i.e., transmission section) transcribes the input speech to provide phonetic tokens representative of the speech (preferably, along with acoustic parameters) for use by the speech synthesizing section 14 (i.e., receiver section). As explained generally above, the transcribed speech and acoustic parameters are provided to a channel 16 for transmission and/or storage. As a specific example, database 70 may be used to store the encoded speech which is representative of the business news provided by the service provider. One advantage of encoding the speech in accordance with the present invention is that a vast amount of information (e.g., business news) may be stored in a comparatively smaller storage unit, such as the database 70, than would otherwise be possible.

Next, the user of an internet phone or personal radio selects user preferences at the user preference interface 72. It is to be understood that the user preference interface 72 may be in the form of software executed on a personal computer whereby the user may make certain selections with regard to the type of news that he or she wishes to receive at a given time. For instance, the user may only wish to listen to national business news rather than both national and international business news. In such case, the user would make such a selection at the user preference interface which would select only national business news from the encoded information stored in database 70. Subsequently, the selected encoded information is provided to the speech synthesizing section 14 and synthesized in accordance with the present invention. Then, the synthesized speech representative of the information which the user wishes to hear is provided to the user via a mobile phone or any other conventional form of audio playback equipment. The speech synthesizing section could be part of the phone or part of separate equipment. Such an arrangement may be referred to as an internet phone when the database 70 is part of the internet. Alternatively, such arrangement may be referred to as a personal radio. Such an application as shown in FIG. 4 is not limited to any particular type of information or service provider or end user equipment. Rather, due to the unique speech coding techniques of the present invention discussed herein, large amounts of information in the form of input speech can be encoded and stored in a database for later synthesis at the user's discretion.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A speech coding system responsive to an input speech signal provided by a system user, the system comprising:

a first speech transcribing means comprising a speech recognition means having a word vocabulary associated therewith, the speech recognition means recognizing words in the input speech signal in accordance with the vocabulary and generating at least one phonetic token representative of the input speech signal;

a second speech transcribing means for generating at least one phonetic token representative of a word in the input speech signal which is not in the word vocabulary;

channel means, responsive to at least one of the phonetic tokens, for handling at least one of the phonetic tokens in accordance with an application of the speech coding system; and speech synthesizing means, responsive to the channel means, for generating a synthesized speech signal using at least one of a plurality of pre-enrolled phonetic tokens that substantially matches at least one of the phonetic tokens which is representative of the input speech signal provided by the system user.

2. The speech coding system of claim 1, wherein the speech recognition means further comprises means for generating acoustic parameters from the input speech signal which include voice characteristics of the system user.

3. The speech coding system of claim 1, wherein each of the phonetic tokens comprises a sequence of lefemes.

4. The speech coding system of claim 1, wherein the speech recognition means further comprises means for identifying the speaker.

5. The speech coding system of claim 1, wherein the speech recognition means further comprises means for identifying a class of speakers.

6. The speech coding system of claim 1, wherein the at least one phonetic token generated by the speech recognition means and the at least one phonetic token generated by the second speech transcribing means have a measure associated therewith, respectively, indicative of the similarity of the phonetic token to the input speech.

7. The speech coding system of claim 6, further comprising comparison means, responsive to the measures associated with the at least one phonetic token generated by the speech recognition means and the at least one phonetic token generated by the second speech transcribing means, the comparison means comparing the respective measures, for a given speech segment, and generating a comparison signal indicative of which measure is higher.

8. The speech coding system of claim 7, further comprising combining means, responsive to the comparison signal and the at least one phonetic token generated by the speech recognition means and the at least one phonetic token generated by the second speech transcribing means, the combining means selecting, for the given speech segment, the phonetic token having the higher measure and combining phonetic tokens from other segments therewith.

9. The speech coding system of claim 1, wherein the channel means further includes:

means for compressing the phonetic tokens prior to one of transmission and storage thereof; and means for decompressing the phonetic tokens prior to synthesis by the speech synthesis means.

10. The speech coding system of claim 1, wherein the channel means further includes:

means for encrypting the phonetic tokens prior to one of transmission and storage thereof; and means for decrypting the phonetic tokens prior to synthesis by the speech synthesis means.

11. The speech coding system of claim 1, wherein the speech recognition means is speaker dependent.

12. The speech coding system of claim 1, wherein the speech recognition means is speaker independent.

13. The speech coding system of claim 1, wherein the speech synthesizing means further comprises:

means for selecting the pre-enrolled phonetic tokens which substantially match the phonetic tokens;

means for associating pre-stored waveforms to the pre-enrolled phonetic tokens;

means for adjusting the pre-stored waveforms in accordance with acoustic parameters associated with voice characteristics of the system user; and means for linking the pre-stored waveforms to form the synthesized speech signal.

14. The speech coding system of claim 13, further comprising means for smoothing the linked pre-stored waveforms forming the synthesized speech signal.

15. The speech coding system of claim 13, wherein the pre-enrolled tokens are background-dependent.

16. The speech coding system of claim 13, further including means for including background-dependent, pre-stored phonetic waveforms in the synthesized speech signal.

17. A speech coding system responsive to an input speech signal, the system comprising:

a speech transcriber comprising a speech recognizer having a word vocabulary associated therewith, for recognizing words in the input speech signal in accordance with the vocabulary and generating a transcription comprising phonetic tokens representative of the input speech signal;

a storage device for storing the phonetic tokens in accordance with an application of the speech coding system; and a speech synthesizer, responsive to the storage device, for generating a synthesized speech signal using at least one of a plurality of pre-enrolled phonetic tokens that substantially matches the phonetic tokens of the transcription representative of the input speech signal, wherein the speech synthesizer comprises means for including background-dependent, pre-stored phonetic waveforms in the synthesized speech signal.

18. The speech coding system of claim 17, further comprising a user interface that allows a system user to select which phonetic tokens are to be provided to the speech synthesizer from the storage device.

19. The speech coding system of claim 17, wherein the input speech signal is provided by an information service provider and the speech synthesizer includes one of an internet phone and a personal radio.

20. A speech coding method responsive to an input speech signal provided by a system user, the method comprising the steps of:

(a) recognizing words in the input speech signal in accordance with a speech recognition vocabulary to generate a first transcription comprising at least one phonetic token representative of the input speech signal;

(b) generating a second transcription comprising at least one phonetic token representative of a word in the input speech signal that is not associated with the speech recognition vocabulary;

(c) one of transmitting and storing at least one of the phonetic tokens; and (d) generating a synthesized speech signal which is representative of the input speech signal provided by the system user using at least one of a plurality of pre-enrolled phonetic tokens that substantially matches at least one of the phonetic tokens.

21. The speech coding method of claim 20, wherein step (a) further includes the step of generating acoustic parameters from the input speech signal which include voice characteristics of the system user.

22. The speech coding method of claim 20, wherein each of the phonetic tokens comprises a sequence of lefemes.

23. The speech coding method of claim 20, further comprising a step of identifying the speaker.

24. The speech coding method of claim 20, further comprising a step of identifying a class of speakers.

25. The speech coding method of claim 20, wherein the at least one phonetic token of the first transcription and the at least one phonetic token of the second transcription have a measure associated therewith, respectively, indicative of the similarity of the phonetic token to the input speech.

26. The speech coding method of claim 25, further comprising the step of comparing the respective measures, for a given speech segment, and generating a comparison signal indicative of which measure is higher.

27. The speech coding method of claim 26, further comprising the step of selecting, for the given speech segment, the phonetic token having the higher measure and combining phonetic tokens from other segments therewith.

28. The speech coding method of claim 20, further including the steps off:

compressing the phonetic tokens prior to one of transmission and storage thereof; and decompressing the phonetic tokens prior to step (d).

29. The speech coding method of claim 20, further including the steps of:

encrypting the phonetic tokens prior to one of transmission and storage thereof; and decrypting the phonetic tokens prior to step (d).

30. The speech coding method of claim 20, wherein step (a) is speaker dependent.

31. The speech coding method of claim 20, wherein step (a) is speaker independent.

32. The speech coding method of claim 20, wherein step (d) further comprises the steps of:

selecting the pre-enrolled phonetic tokens that substantially match the phonetic tokens;

associating pre-stored waveforms to the pre-enrolled phonetic tokens;

adjusting the pre-stored waveforms in accordance with acoustic parameters associated with voice characteristics of the system user; and linking the pre-stored waveforms to form the synthesized speech signal.

33. The speech coding method of claim 32, further comprising the step of smoothing the linked pre-stored waveforms forming the synthesized speech signal.

34. The speech coding method of claim 32, wherein the pre-enrolled tokens are background-dependent.

35. The speech coding method of claim 32, further comprising the step of including background-dependent, pre-stored phonetic waveforms in the synthesized speech signal.

36. A program storage device readable by a machine, tangibly embodying a program of instructions executable by the machine to perform method steps for speech coding, the method steps comprising:

(a) recognizing words in the input speech signal in accordance with a speech recognition vocabulary and generating a transcription comprising phonetic tokens representative of the input speech signal;

(b) storing the phonetic tokens; and (c) generating a synthesized speech signal which is representative of the input speech signal using at least one of a plurality of pre-enrolled phonetic tokens that substantially matches the phonetic tokens of the transcription, wherein step (c) further comprises the step of including background-dependent, pre-stored phonetic waveforms in the synthesized speech signal.

37. The program storage device of claim 36, further comprising instructions for performing the step of receiving input commands from a system user indicating which phonetic tokens are to be used to generate the synthesized speech signal.

38. The program storage device of claim 36, wherein the input speech signal is provided by an information service provider and the synthesizing step is performed by one of an internet phone and a personal radio.

* * * * *